(12) United States Patent
Rymon

(10) Patent No.: US 7,904,556 B2
(45) Date of Patent: Mar. 8, 2011

(54) METHOD AND APPARATUS FOR ROLE GROUPING BY SHARED RESOURCE UTILIZATION

(75) Inventor: Ron Rymon, Herzlia (IL)

(73) Assignee: Computer Associates Think, Inc., Islandia, NY (US)

( * ) Notice: Subject to any disclaimer, the term of this patent is extended or adjusted under 35 U.S.C. 154(b) by 819 days.

(21) Appl. No.: 10/087,990

(22) Filed: Mar. 5, 2002

(65) Prior Publication Data

US 2003/0172161 A1 Sep. 11, 2003

(51) Int. Cl.
*G06F 15/173* (2006.01)
*G06F 15/00* (2006.01)
*G06F 9/46* (2006.01)
*G06F 17/30* (2006.01)

(52) U.S. Cl. ......... 709/225; 709/226; 709/229; 718/104; 707/706

(58) Field of Classification Search .......... 718/100–107; 709/226, 229, 225; 715/735, 736; 707/100, 707/3, 6
See application file for complete search history.

(56) References Cited

U.S. PATENT DOCUMENTS

| | | | | |
|---|---|---|---|---|
| 5,325,526 A | * | 6/1994 | Cameron et al. | 718/102 |
| 5,442,791 A | * | 8/1995 | Wrabetz et al. | 719/330 |
| 5,941,947 A | * | 8/1999 | Brown et al. | 709/225 |
| 6,144,959 A | * | 11/2000 | Anderson et al. | 707/9 |
| 6,233,576 B1 | * | 5/2001 | Lewis | 707/9 |
| 6,366,945 B1 | * | 4/2002 | Fong et al. | 718/104 |
| 6,560,639 B1 | * | 5/2003 | Dan et al. | 709/218 |
| 6,675,261 B2 | * | 1/2004 | Shandony | 711/121 |
| 6,871,232 B2 | * | 3/2005 | Curie et al. | 709/225 |
| 6,952,766 B2 | * | 10/2005 | Dervin et al. | 713/2 |
| 6,990,527 B2 | * | 1/2006 | Spicer et al. | 709/229 |
| 2001/0023440 A1 | * | 9/2001 | Franklin et al. | 709/226 |
| 2002/0013847 A1 | * | 1/2002 | Fisher et al. | 709/226 |
| 2002/0040389 A1 | * | 4/2002 | Gerba et al. | 709/219 |
| 2002/0087678 A1 | * | 7/2002 | Padilla | 709/223 |
| 2003/0051038 A1 | * | 3/2003 | Spicer et al. | 709/229 |
| 2003/0061263 A1 | * | 3/2003 | Riddle | 709/104 |
| 2003/0233439 A1 | * | 12/2003 | Stone et al. | 709/223 |

OTHER PUBLICATIONS

Department of Computer & Information Science Technical Reports (CIS), University of Pennsylvania "Search Through Systematic Set Enumeration" by Ron Rymon, 14 pages, Aug. 1992.

* cited by examiner

*Primary Examiner* — Hyung S. Sough
*Assistant Examiner* — Phuong N Hoang
(74) *Attorney, Agent, or Firm* — Baker Botts L.L.P.

(57) ABSTRACT

Role search apparatus for grouping nodes according to relationships with other nodes, the apparatus comprising: an input for receiving an arrangement of nodes said arrangement comprising at least two partitions of said nodes and with predetermined relationships between nodes across said partitions, and a pattern recognition unit associated with said input, for using pattern recognition on said nodes and said relationships to find relationship patterns amongst said nodes, thereby to form at least one group from nodes of a first of said partitions, wherein said nodes being formed into said group share relationships with same ones of a predetermined number of nodes in a second partition.

34 Claims, 9 Drawing Sheets

Fig. 11

METHOD AND APPARATUS FOR ROLE GROUPING BY SHARED RESOURCE UTILIZATION

FIELD OF THE INVENTION

The present invention relates to a method and apparatus for role grouping by shared resource utilization and more particularly but not exclusively to grouping of users into roles according to their access rights to shared resources, typically but again not exclusively over a network.

BACKGROUND OF THE INVENTION

Reference is firstly made to the following publications, [Shannon, 48]Claude Shannon, "The Mathematical Theory of Communication," Bell Systems Technical Journal, 30:50-64, 1948, and [Rymon,92]. Search Through Systematic Set Enumeration. Principles of Knowledge Representation and Reasoning, pp. 539-550, Morgan-Kauftnan, 1992, the contents of which are hereby incorporated by reference.

A growing number of enterprise software applications are role-based, i.e., users and sometimes transactions are logically grouped based on a certain commonality. Examples of such applications include but are not limited to Security Authorization, Authentication, and Administration (3A), and Role-Based Access Control (RBAC), Enterprise Resource Planning (ERP), Human Resources/User Provisioning, eBusiness Management, and Supply Chain Management (SCP). The use of roles (sometimes formulated as"rules") makes using these large software suites more manageable and more efficient problem is that when a new software suite is about to be deployed in an organization that has not previously used them, the task of identifying and specifying roles is extremely hard and practically intractable for medium and large organizations. Computationally, the cost of simply considering all possible roles is equivalent to solving an NP-Hard problem and is thus not amenable to a brute force search algorithm.

Without tools that can identify logical roles and groupings, organizations find themselves in one of three situations
  (1)they are unable to implement roles, or they implement roles in only a small part of the organization
  (2)they use consultants and internal staff for a significant period of time and at a very high cost, to manually identify and specify roles, and Organizations that fall into the first category are simply not reaping the full benefits of the specific enterprise software. Organizations that fall into the second category find themselves paying dearly in implementation costs. Indeed it is estimated that the Cost of implementing enterprise software ranges from two to ten times the cost of the original license for the software itself. In addition, such projects are risky and may significantly delay the implementation of newly purchased software.

SUMMARY OF THE INVENTION

The present embodiments provide a method and apparatus for automated elicitation and specification of implicit roles and tasks, particularly using existing explicit information relating to a user population and its access levels and utilization levels of resources. The present embodiments use pattern recognition algorithms in assignment of different users to role groups. Preferably, the assignment of role groups is related to access to resources.

According to a first aspect of the present invention there is thus provided role search apparatus for grouping nodes according to relationships with) other nodes, the apparatus comprising:

an input for receiving an arrangement of nodes said arrangement comprising at least two partitions of said nodes and with predetermined relationships between nodes across said partitions, and a pattern recognition unit associated with said input, for using pattern recognition on said nodes and said relationships to find relationship patterns amongst said nodes, thereby to form at least one group from nodes of a first of said partitions, wherein said nodes being formed into said group share relationships with same ones of a predetermined number of nodes in a second partition.

Preferably, said nodes in said first partition are users of a network, said nodes in said second partition are resources of said network and said relationships are access permissions.

Preferably, said nodes in said first partition are users of a network, said nodes in said second position are resources of said network and said relationships are usage levels of respective resources by respective users.

Preferably, said relationships further comprise user access permission levels for respective resources.

Preferably, said at least one group is definitive of a user role on said network.

Preferably, said pattern recognition unit is associated with a search engine operable to use a search tree to begin with a single resource and its associated users, and iteratively to add resources and remove users not having a predefined relationship with said iteratively added resources, to meet a resource number, user number constraint.

Preferably, said search engine is operable to use a homogeneity measure to determine whether to consider a candidate grouping in said search.

Preferably, said search engine is operable within said iterative stages to add further resources common to a current set of users.

Preferably, said search engine is operable to compute a set of all users related to a current set of resources.

Preferably, said search engine is operable to consider for expansion all resources outside said current set of resources that have at least one relationship connection with a current set of users.

Preferably, each of said nodes are associated with attributes, and wherein said homogeneity measure is the percentage of occurrence of a given attribute, multiplied by the log value thereof, summed over nodes in said result.

Preferably, said homogeneity measure is the percentage of occurrence of a given relationship multiplied by the log value thereof, summed over nodes in said result.

Preferably, said pattern recognition unit is operable to use said pattern recognition within an iterative tree searching process.

Preferably, said pattern recognition unit is operable to insert said groupings as an intermediate partition amongst said nodes, thereby to redefine said relationships through said groupings.

Preferably, said nodes are arranged into three partitions, an intermediate one or said partitions comprising predetermined relationship dependent groupings of at least some of the nodes in a first of said partitions, said pattern recognition unit being operable to use said pattern recognition to add new groups to said intermediate partition, that is to say the invention removes some or all of the direct relationships between nodes in the two original partitions if it is logically replaceable by an indirect relationship through a node in the third partition.

Preferably, said input is associated with a graphical expository which is operable to form said nodes into said partitions.

Preferably, said nodes are arranged into three partitions, an intermediate one of said partitions comprising predetermined relationship dependent groupings of at least some of the nodes in a first of said partitions, said pattern a recognition unit being operable to use said pattern recognition to add new groups to said intermediate partition.

According to a second aspect of the present invention there is provided a role search method for electronically grouping nodes according to relationships with other nodes, the method comprising:

receiving an arrangement of nodes, said arrangement comprising at least two partitions of said nodes and with predetermined relationships between nodes across said partitions and using pattern recognition on said nodes and said relationships to find relationship patterns amongst said nodes, thereby to form at least one grouping of nodes of a first of said partitions, wherein said nodes being formed into said grouping share relationships with same ones of a predetermined number of nodes in a second partition.

According to a third aspect of the present invention there is provided a reverse engineering tool for discovering structure in a partitioned nodal arrangement, the tool comprising:

an input for receiving an arrangement of nodes, said arrangement comprising at least two partitions of said nodes and with predetermined relationships between nodes across said partitions, and a pattern recognition unit for using pattern recognition on said nodes and said relationships to find relationship patterns amongst said nodes, thereby to form at least one group from nodes of a first of said partitions, wherein said nodes being formed into said group share relationships with same ones of a predetermined number of nodes in a second partition.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particular shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
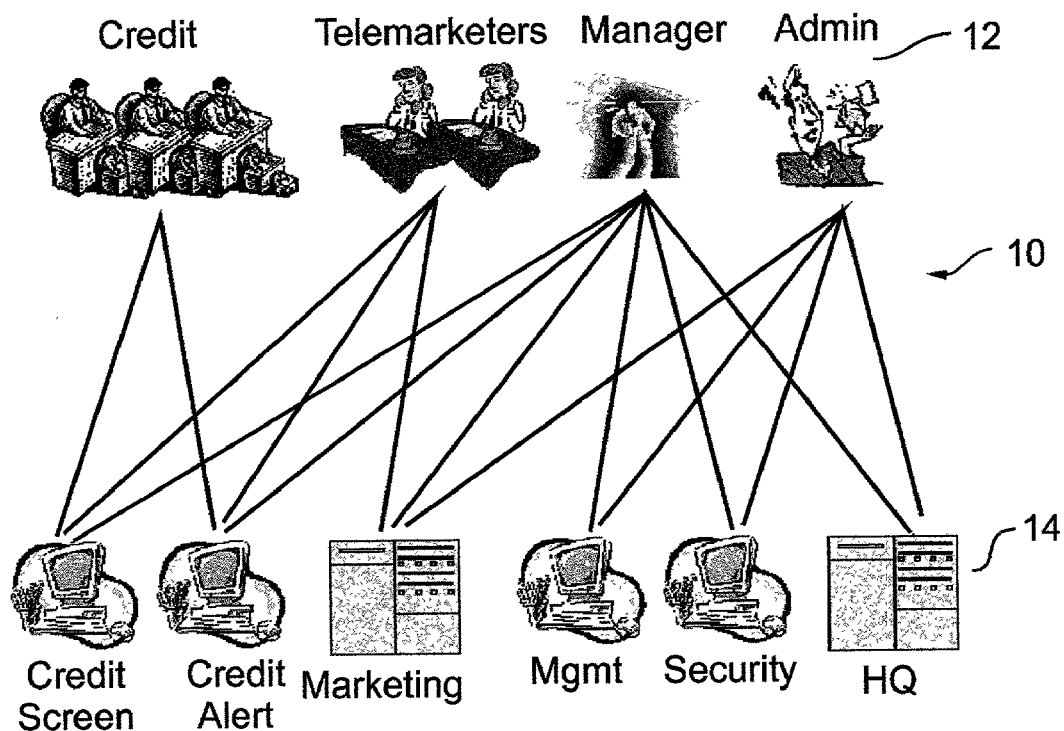
FIG. 1 is a simplified diagram showing network users and network resources arranged as a bipartite graph.

The present embodiments describe an engine and corresponding method that uses pattern recognition algorithms to reverse engineer roles form existing relationships. Using this engine, a system is disclosed that discovers roles for role-based access control. The same engine can be used to identify roles and other logical groupings in other applications. Alternative engines and corresponding algorithms are disclosed as additional embodiments.

Principally, certain commonalities within the group of users or transactions that can be observed in existing information and empirically observed data are searched for. Algorithmically, the search involves a combination of an Artificial Intelligence type search algorithm and information theoretic principles that are commonly used in pattern recognition applications. The observed information is used to (a) constrain the search, and (b) induce an effective order on the search.

grouping candidates are then evaluated using information-theoretic measures. Finally, the system relies on its human operator for verification and for small but sometimes crucial corrections.

As will be explained in more detail below, Set Enumeration Search, as disclosed in the above-mentioned reference, Rymon, 92, is used to search the space of possible grouping candidates. Entropy-based measures as disclosed in above mentioned reference Shannon 48, may be used on a group of indicated fields, to evaluate candidates and to identify promising search avenues.

Before explaining at least one embodiment of the invention in detail, it is to be understood that the invention is not limited in its application to die details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified bipartite graphical illustration 10 showing a typical organization in which a plurality of users have shared access to networked resources, The users appear in a first row 12 and networked resources are shown in a second row 14. Edges 16 link between users and the resources to which they are allowed access.

The bi-partite graph may be taken as a description of the input to the user role group classification problem. In graph 10, the top row 12 and the bottom row 14, are hereinafter referred to as partitions, and each represent one type of entity. As explained, the top partition represents users, and the bottom partition represents resources. The graph's edges represent relationships, i.e., a user that is allowed to access a resource. It is noted that any given user may be permitted to use multiple resources, and any given resource may be accessible to a number of users. In other applications, a k-partite graph may be used, with a partition for different types of entity Relationships may also be of several types e.g., access not allowed; read access only; read and write access; read, write and reconfigure access etc.

As discussed in the introduction, in a large organization, large numbers of users are involved, each having assigned access levels to various resources. The access levels most likely grown organically, which is to say that each user has been assigned access levels as needed, and his access levels have been changed as his role has changed.

Additionally or alternatively to access rights, the graph may be built up based on usage patterns if the appropriate data is available, At some stage, the organization may introduce a new software system, itself requiring that different users have different access levels. The task facing the implementers of the new software is to assign the organization's users appropriate access levels to the new software. If the organization is large then the task is enormous. A further example is the provisioning of new employees with the access rights they need. Figuring out the correct usage rights for the individual is very hard, and often an administrator will simply look for another user that performs a similar job, and will copy same permissions for the new user. However, this existing employee may also have other tasks, and may historically have many extraneous permissions.

A preferred embodiment of the present invention thus makes use of existing organizational information such as existing access levels to identify groups of users with certain commonalities. In the example of a new software suite for an organization, the most important commonality is likely to be that they all share access rights to a certain group of resources. It is observed that each of the users may have rights to additional resources beyond the common ones.

Other types of commonalities may be described, simply by adding another partition to the graph of FIG. 1. For example, a geographic location partition may be provided, in which one node is provided for each of the organization's offices, and then each user, and possibly each resource, may be linked to one or more offices in which the user works, or where the resource is located. Alternatively, in a preferred embodiment auxiliary information about users and resources may be stored as attributes, and will thus be evaluated using the entropy-based evaluator.

Figure 2:
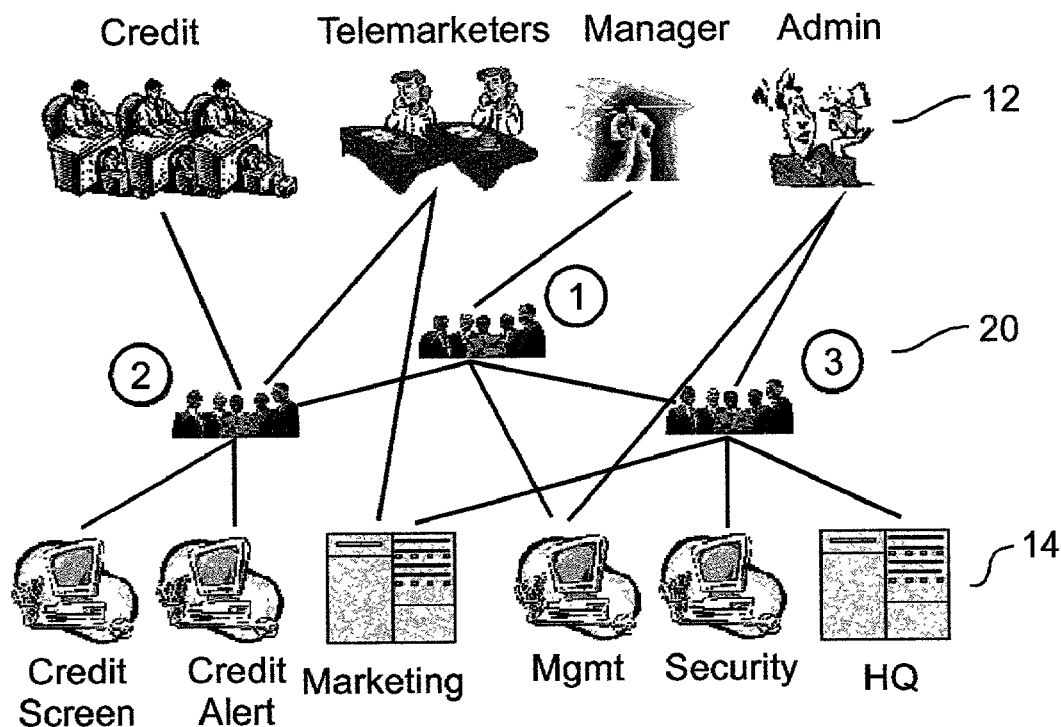
FIG. 2 is a simplified diagram showing the network users of FIG. 1 following a grouping process to form a tripartite graph.

Reference is now made to FIG. 2, which is a tri-partite graph, corresponding to the bi-partite graph of FIG. 1 but comprising an additional layer 20 of roles, to which users may be grouped. Edges extend from individual users in row 12 to one or more roles in row 20 in which s/he participates, and with other edges going from a role, either in row 12 or in row 20 to all resources that are permitted to the individual or to the group of users. Ideally, in a simple statement of the problem, it is intended to replace as many of the direct user-group resource relationships with relationships that are defined via one or more roles of row 20.

unfortunately, even without the extra partitions, the above simple statement of the problem is computationally intractable for more than a very small number of users. In fact, it is quite easy to show that the problem is in general NP-hard. In the present embodiments, the problem is moved into the domain of the computationally possible by the use of problem-specific constraints, and intelligent search to construct a workable system, as will be discussed in more detail below.

Figure 3:
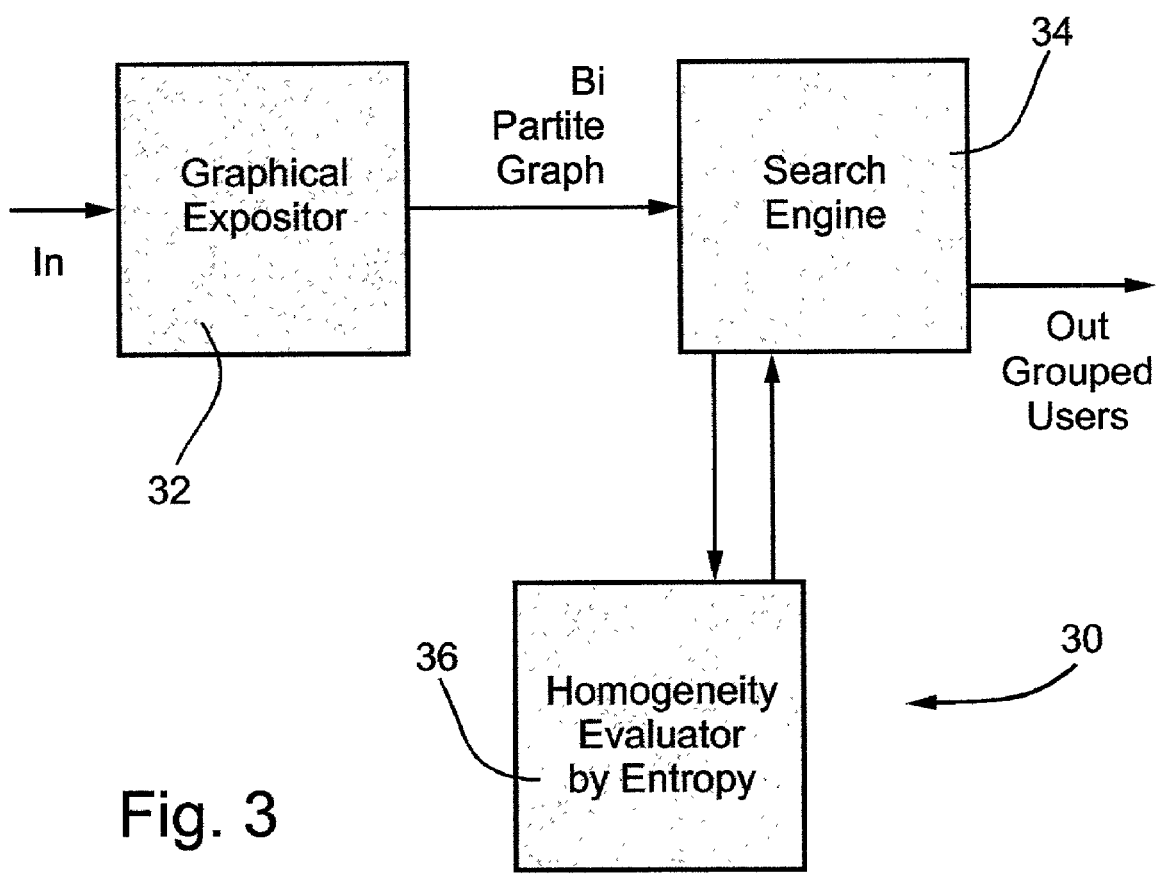
FIG. 3 is a simplified block diagram showing node grouping apparatus according to a first preferred embodiment of the present invention.

Reference is now made to FIG. 3, which is a simplified block diagram of a system for carrying out a search in order to solve the above-described problem. A system 30 comprises a graphical expositor 32 which receives user information, resource information, user access levels, usage and other relevant input, and expresses them in terms of a bipartite graph of the kind shown in FIG. 1. A search engine 34 then carries out a search to group the users into role groups of the kind shown in FIG. 2. A preferred embodiment of the search is described below in respect of FIG. 4.

A homogeneity evaluator 36, associated with the search engine 34, uses Shannon entropy to measure the homogeneity of the users as they are grouped together by the search engine. As will be discussed below with respect to FIG. 4, the homogeneity measurement is an integral part of the search process as carried out by the search engine, and helps to constrain the search to manageable proportions whilst still giving helpful results.

Returning to the search engine 34, and the implemented system searches intelligently through a small, but most relevant portion of the space of all possible resource subsets, taking advantage of built-in constraints. A preferred embodiment uses the SE-tree search algonim [Rymon92], and reference is now made to FIG. 4, which is a simplified flow chart showing steps in the SE tree search algorithm of the preferred embodiment.

1. The search process starts at a root of the search tree with an empty set of resources. The View, i.e., the set of all one-resource expansion opportunities, is defined, for the root, to contain all of the resources. The root is thus used to provide a first node to be put into an OpenNodes set for the search.
2. The search recursively picks the next most promising node from the OpeNodes set, according to the evaluation function discussed hereinbelow with respect to evaluator 36.
3. For a current candidate node, the algorithm computes first a set of users (U1) that use all of the node's resources. Then, it computes the resources (R1) that are common to all the users in the set U1, which resources may easily extend beyond the nodes original resources.
4. The above combination of users and resources, if not empty, now becomes a role candidate. The algorithm checks if the current role candidate adheres to a set of user-imposed restrictions (e.g., searching for role candidates with at least 5 resources and at least 10 users), and decides whether to accept it or not.
5. If it is accepted, then the node is defined as a role group, and the algorithm proceeds to the next node in the OpenNodes set. Otherwise, the algorithm tries to further refine the present node as follows.
6. It computes the set of all users that use the node's resources (U2). Then it computes the set of legal expansions to include any resource of any user in U2 that was also previously in the View of a NextNode (V1),
7. The algoritlun adds all valid one-resource expansions to the OpenNodes set. Let r2 be the newly added resource, the View of the node expanded with r2 is thus restricted
    (a) by the choice of r2, and
    (b) by the resources that are accessible to at least one of the users of all of node's resources.

This Latter is a key point because the available resources for expansion are likely to diminish rapidly in a sparse enough graph Indeed, in most organizations, the user-resource graph is very sparse.

Figures 5, 6:
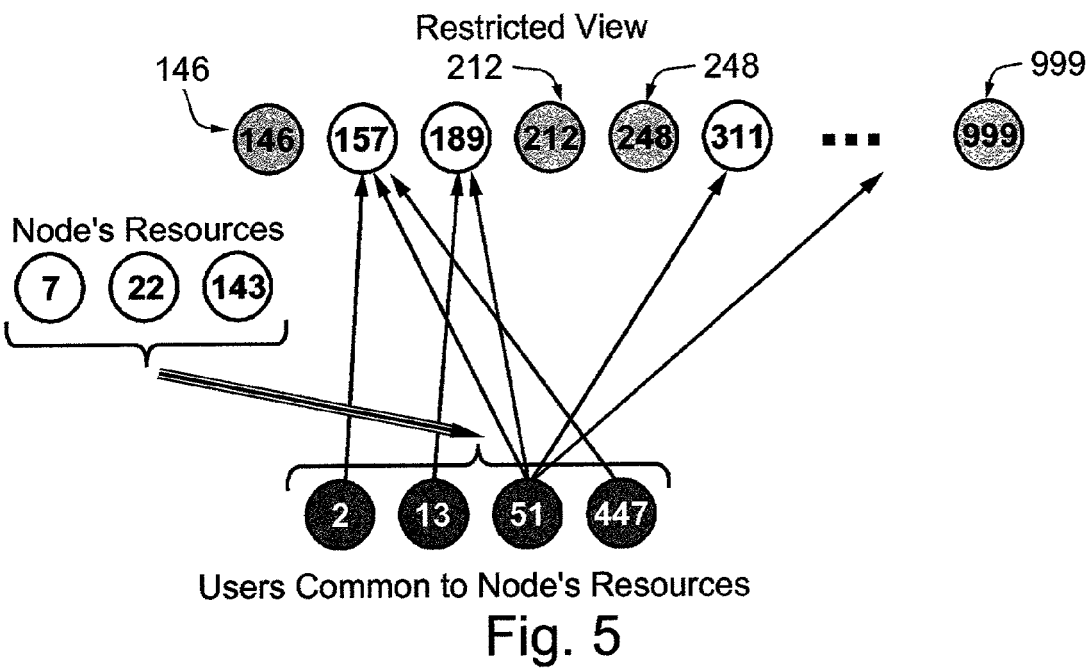
FIG. 5 is a simplified diagram showing a stage in the search procedure of FIG. 4, and FIGS. 6-11 are screen views showing various stages of use of the apparatus of FIG. 3.

FIG. 5 is a simplified graph which depicts such a diminution of candidate resources. A single node at the left of the graph (7, 22, 143) represents a set of resources which are already part of a current candidate role group node. The rightmost resource 143 is the most recent addition to the current candidate group node. As a result, the current view (the nodes across the top of the graph) is first restricted to resources with numbers higher than 144. Below are those users that have access to each and every one of the node's resources. The algorithm restricts tie View (at the top of the graph) further to include only resources touched by at least one of the above users. The algorithm then moves on to the next most promising node in the OpenNodes set (Step 3).

A candidate grouping for a node, and nodes to be included therein, can be evaluated along a number of dimensions, in the following ways:

1. number of users and resources that participate in any given role. Clearly, the more users and resources participate, the less likely this combination is a coincidence and the more likely it is a result of some common tasks and/or structure.
2. The homogeneity of the users amongst themselves according to their relevant attributes, e.g., if many of them belong to the same business unit, geographical location, report to the same people, etc.
3. The homogeneity of the resources amongst themselves, e.g., if they all comprise permissions that relate to the same computing platform or application, if they are situated in the same place, etc.
4. homogeneity of the resources of individual users that are not covered by the role. If this is high then again it is unlikely to be coincidence and rather supports the assumption that they probably belong to another role
5. The homogeneity of the users of individual resources that are not covered by the role. Again, if this is high then again it is unlikely to be coincidence and rather supports the assumption that they probably belong to another role Homogeneity is measured by he homogeneity evaluator 36 of FIG. 3, and may use attributes associated with the relevant nodes, or may use the relationships or relationship types, or in a particularly preferred embodiment may use all three.

From a search perspective, and to arrive at a minimal set of roles, one may also seek roles that cover user-resource relationships that have not yet been covered by another role.

In the preferred embodiment, the homogeneity evaluator uses the following mechanisms to evaluate individual node candidates according to the above-mentioned five ways.

1. The users and/or resources in question are weighted, preferably by user-defined importance weights;
2. The well-known Shannon's entropy formula is used to evaluate homogeneity. For each of a user's and/or resource's descriptive fields, the user has preferably associated a weight. The entropy of the current field may then be computed as $$-\Sigma P \log P$$

summed over all possible values of the current field, wherein P is the percent of occurrence of this field amongst the relevant group.

3. The partial evaluations are then summed into a single score, which is used to evaluate nodes during the search for role candidates, as described above.

In a further preferred embodiment of the present invention, the input is a tripartite graph in which roles are already defined. The search is carried out as described above in order to further refine the search and to discover new roles.

In any resulting role grouping, any individual user may be allowed an assignment of any number of roles. For example a given user based on the first floor, and on committee A and being a section managers may be allowed use access to the first floor main printer, reading access to the database A' of matters pertinent to committee A, and read and write access to the folders of his section, each by virtue of a different role.

The apparatus preferably allows partitioning of the graph into sub-graphs, each of these sub-graphs being itself a bipartite graph but limited to a subset of the nodes in the first partition, with all the nodes in the second partition that are linked to them (or vice versa, a subset of the nodes in the second partition with all nodes in the first partition that are linked to them).

The apparatus preferably performs the groupings on each of the subgraphs, and finally merges the results into the original full graph. The partitioning is typically based on some of the attributes of the users e.g. geographic location, rank, etc, or of the resources, and in the principle embodiments these are people and processes vs. attributes.

An application of the apparatus within ail organization is the case of Security breaches that can be discovered as a result of the grouping process. The graphical expositor is user interactive and allows the operator to review whether a user that was grouped by the grouping apparatus should really belong to a current group, or even whether he should have his currently assigned relationships with resources. If necessary the user can be removed from the group or, more typically, denied the relationships deemed inappropriate Reference is now made to FIGS. 6-11, which are a series of screen views illustrating successive stages in the use of the above described embodiment on a user-resource database. FIG. 6 is a screen view of a bipartite graph 60 showing on the left hand side 62 a list of system users and on the right hand side 64 a list of system resources Each user has a list of resources that he has access to, and likewise each resource has a list of users that are allowed access thereto. A central partition 66, for roles that group users having similar access relationships to resources is shown as currently empty.

Figure 7:
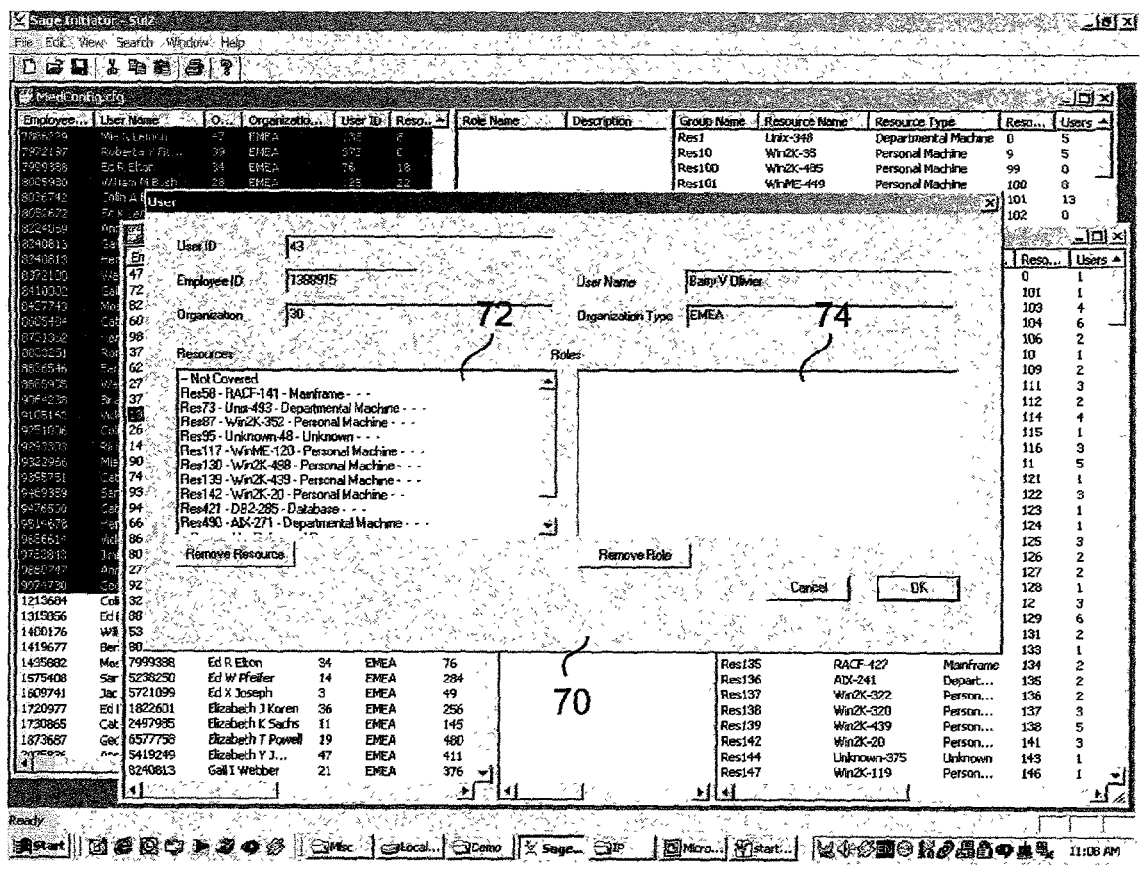

FIG. 7 is a screen view showing a user dialogue window 70 in which an identified employee is shown with a list of his associated resources 72 and any associated roles 74. At the moment the search algorithm has not been run and therefore there are no roles. The dialogue window allows for manual addition and deletion of both resources and roles.

Figure 8:
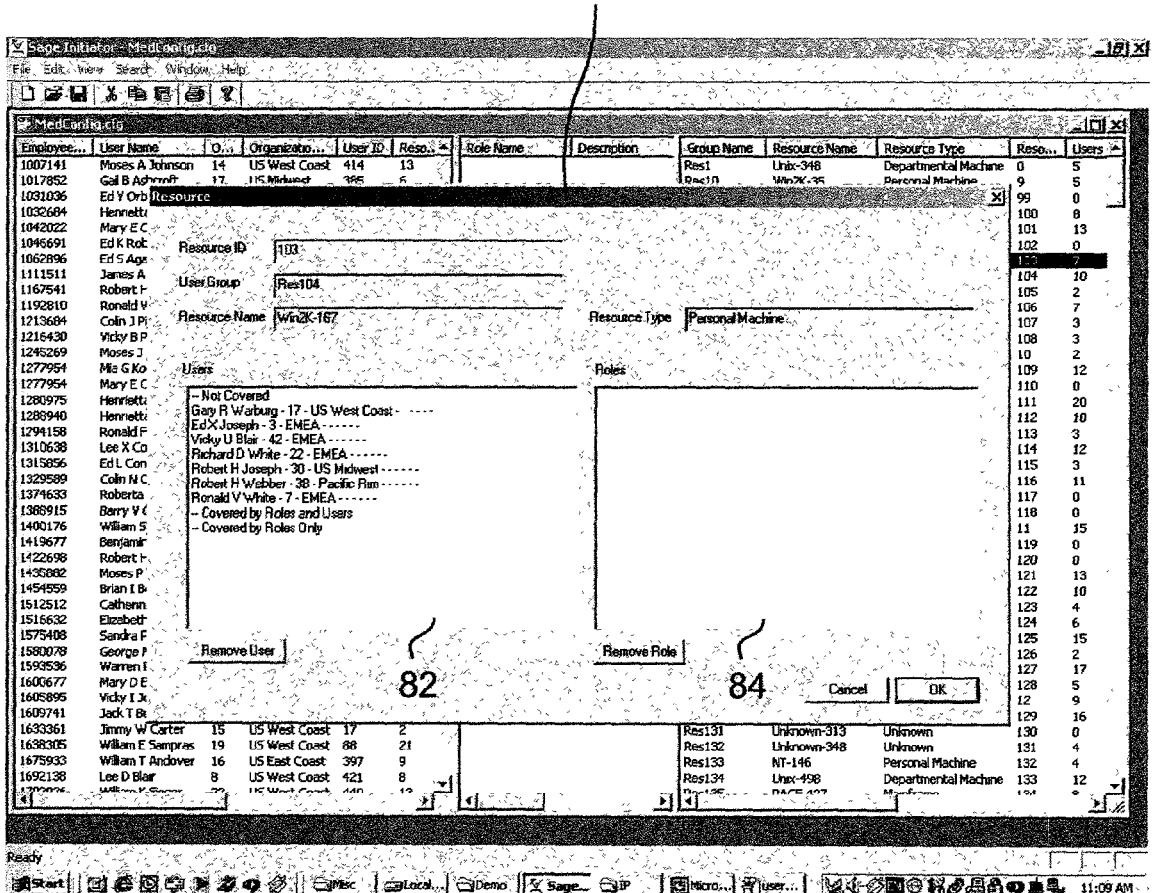

FIG. 8 is a screen view showing a similar dialogue window 80, but this time defined for a resource. Associated users are shown on one side 82 and again no roles are shown on a second side 84. In general, roles are not usefully defined for the resources, but the possibility is provided if found to be relevant.

Figure 9:
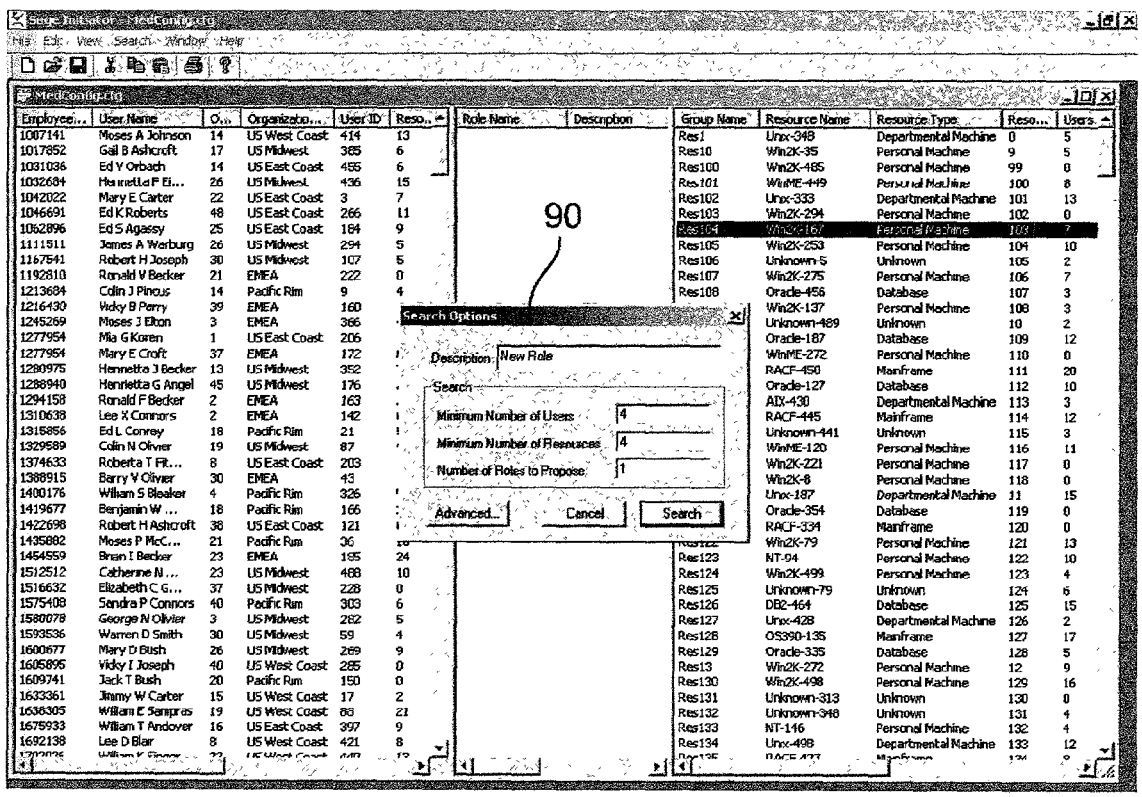

FIG. 9 is a further view of the bipartite graph screen of FIG. 6, this time with a search dialogue window 90 open in front. The search dialogue window allows input parameters to be set for defining a role search. A new role is defined, and generally not given a name at this stage since it is not known what kind of a role is to be found. A minimum number of users is defined for the role, as is a minimum number of resources. Finally, a number of roles to be proposed is set.

Figure 4:
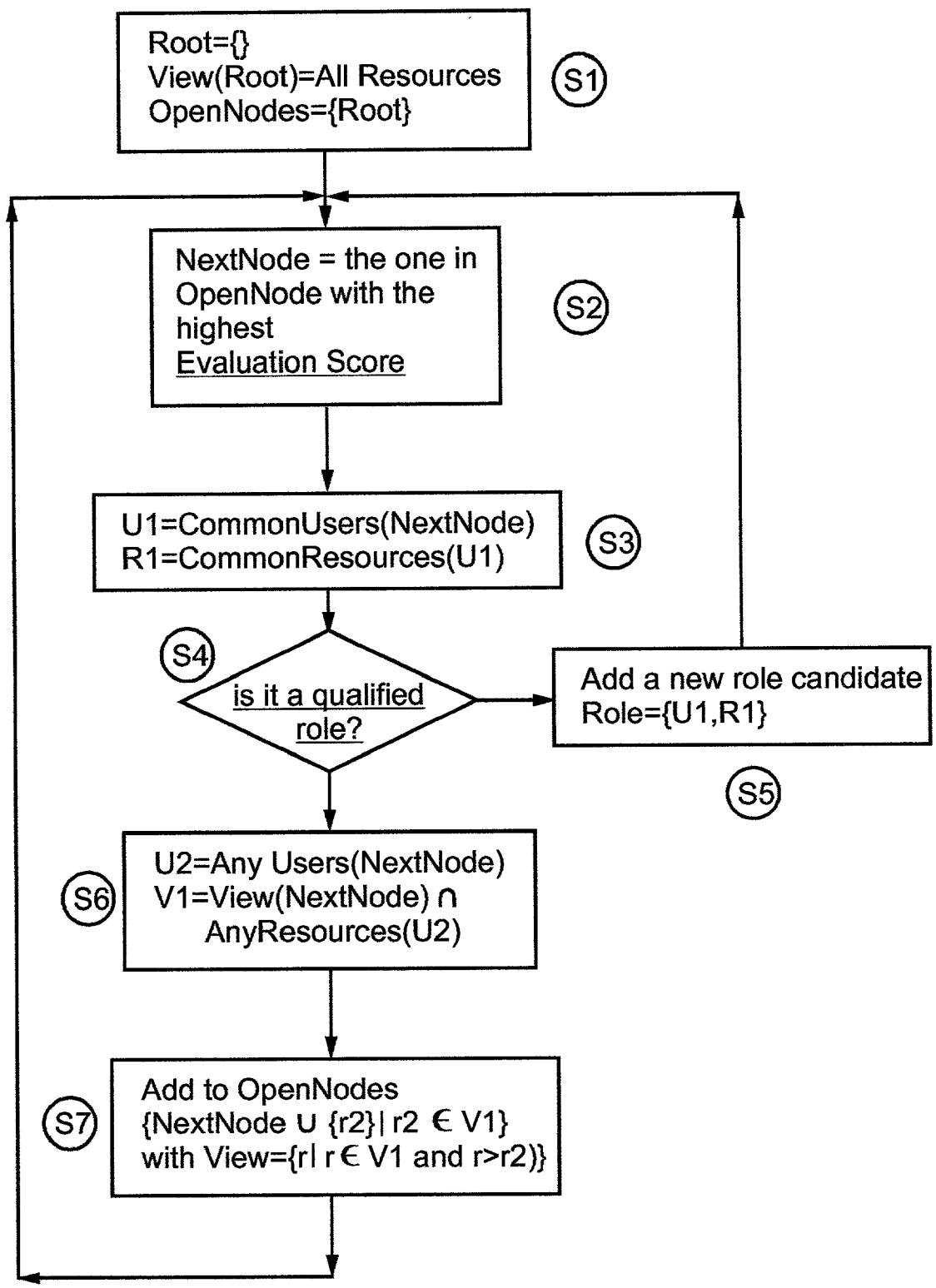
FIG. 4 is a simplified flow chart showing a search procedure for use by the search engine of FIG. 3.

The constraints entered into the window 90 are then used to carry out a search of the kind described with reference to FIGS. 4 and 5, and a role answering to the constraints is then searched for.

Figure 10:
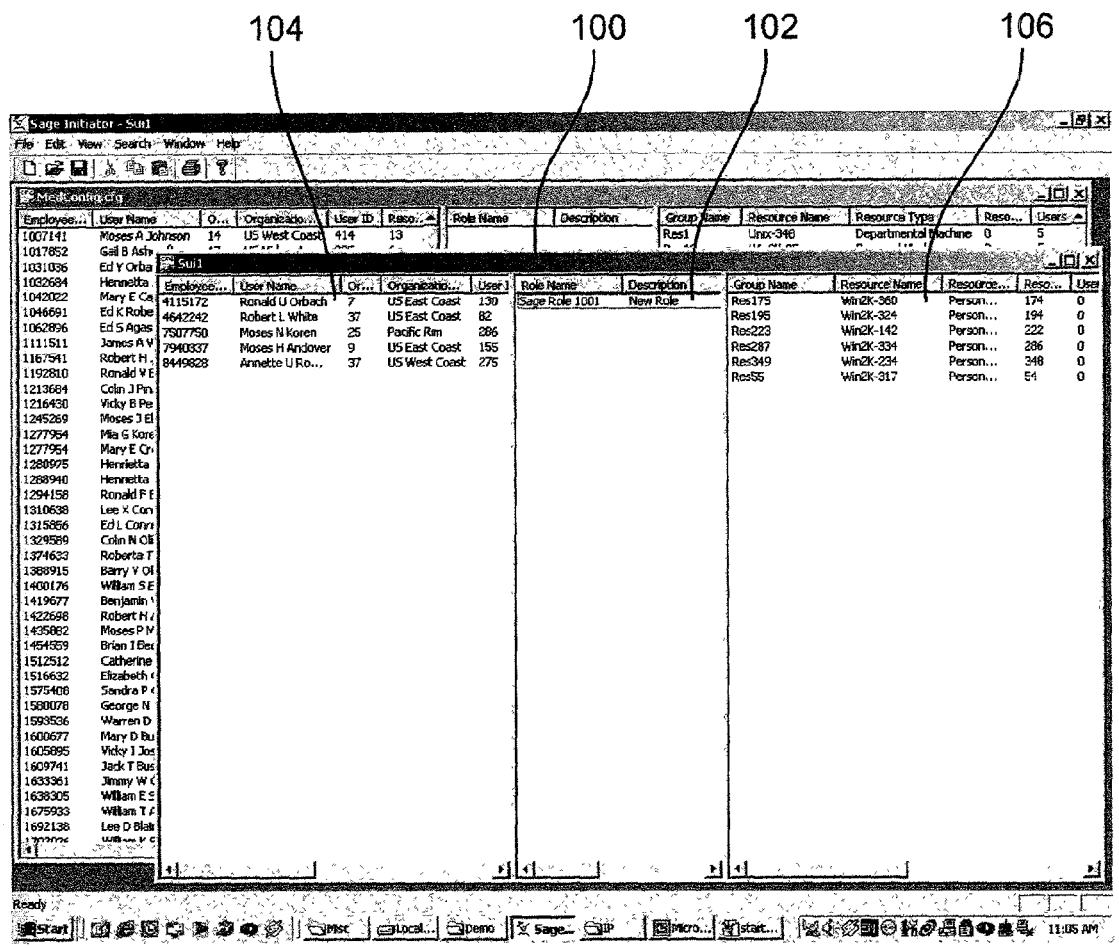

Reference is now made to FIG. 10 which shows a role definition window 100. The role is shown in a middle column 102. Users associated with the role are shown on the left hand side 104 and resources associated with the role are shown on the right hand side 106. At this point it may be possible for an operator to note something in common between the users, or for that matter between the resources, to enable him to provide a useful label with which to name the group.

Figure 11:
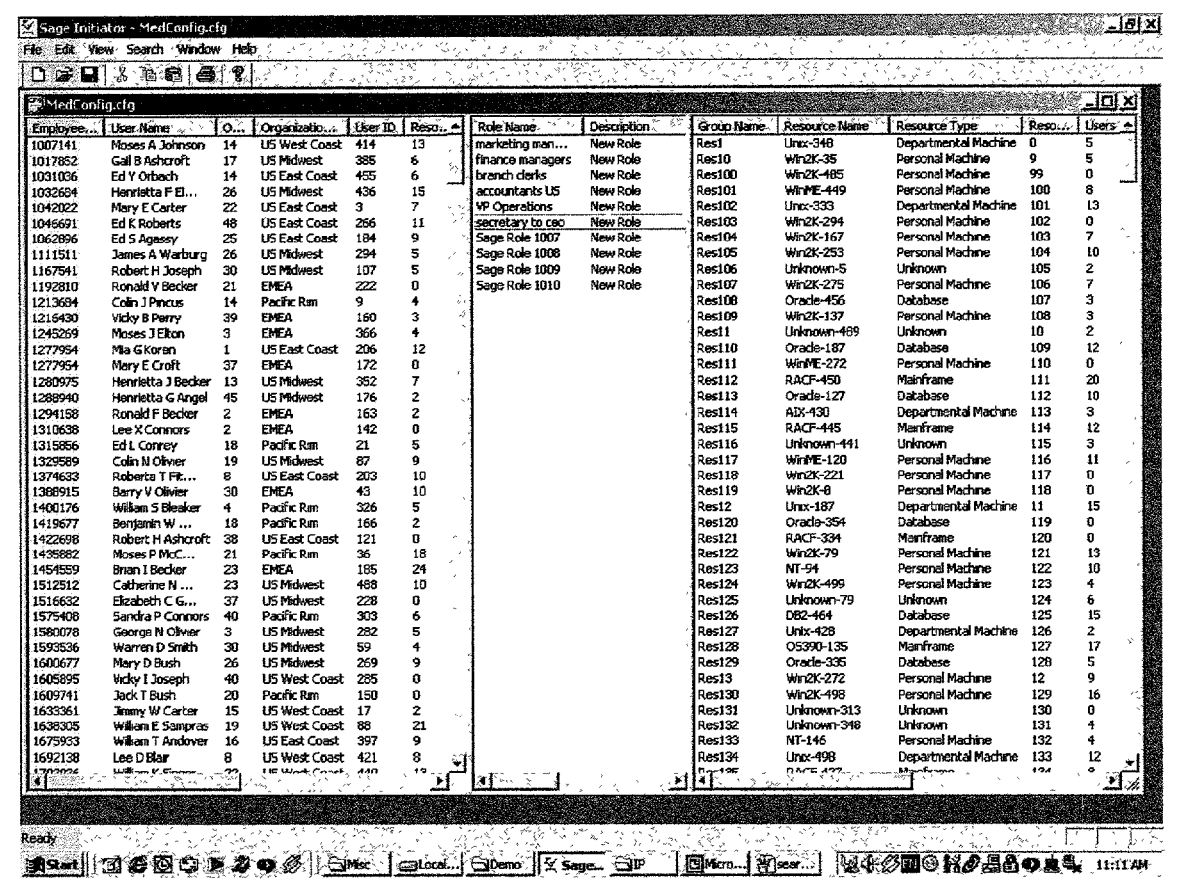

FIG. 11 is a screen view showing a series of roles as they may appear after a number of searches have been carried out.

There is thus provided a system that is able to group users into homogenous groups, thereby to provide them with access levels for a new system flat are appropriate to their roles within an overall organization, to which the homogenous groups are expected to correspond. On another level the embodiments provide an analysis or reverse engineering tool for discovering structure in a partitioned nodal arrangement.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. Computer apparatus configured to discover roles from structure existing amongst users to whom resources have been assigned, the apparatus comprising:
   a processor,
   a discovery unit, operable via said processor, configured for searching for patterns within links between users and resources partitioned into a set of nodes of users and a set of nodes of resources, wherein:
      each user of said set of nodes of users comprises a node with an assignment of resources from the set of nodes of resources, and
      the links comprise said assignments between respective users and resources,
   a grouping unit, associated with said discovery unit, configured to use said discovered patterns to form at least one group from said user nodes using said discovered patterns, such that:
      users having all or a subset of at least two links to common resources are automatically determined to be placed into a same group, and
      the users of the at least one group did not exist as a group prior to the discovery unit searching for patterns within the links, and
   an output unit configured for outputting said at least one group of users or resources as a role.

2. The apparatus of claim 1, wherein said links comprise access permissions.

3. The apparatus of claim 2, wherein said links further comprise user access permission levels for respective resources.

4. The apparatus of claim 2, wherein said role is definitive of a user role on said network.

5. The apparatus of claim 2, wherein said discovery unit is associated with a search engine operable to use a search tree to begin with a single resource and its associated users, and iteratively to add resources and remove users not having a predefined relationship with said iteratively added resources, to meet a resource number, or a user number constraint.

6. The apparatus of claim 5, wherein said search engine is operable to use a homogeneity measure to determine whether to consider a candidate grouping in said search.

7. The apparatus of claim 6, wherein the set of users associated with each of said nodes is associated with attributes, and wherein said homogeneity measure is the percentage of occurrence of a given attribute, multiplied by the log value thereof, summed over all such users in said result.

8. The apparatus of claim 6, wherein the set of resources associated with each of said nodes is associated with attributes, and wherein said homogeneity measure is the percentage of occurrence of a given attribute, multiplied by the log value thereof, summed over all such resources in said result.

9. The apparatus of claim 6, wherein said homogeneity measure is the percentage of occurrence of a given resource relationship for any of the users associated with at least one of the resources of said node, multiplied by the log value thereof, summed over all users of said node in said result.

10. The apparatus of claim 6, wherein said homogeneity measure is the percentage of occurrence of a given user relationship for any of the resources associated with at least one of the users of said node, multiplied by the log value thereof, summed over all resources of said node in said result.

11. The apparatus of claim 5, wherein said search engine is operable to use a homogeneity measure to determine in which order to consider a candidate grouping in said search.

12. The apparatus of claim 5, wherein said search engine is operable within said iterative stages to add further resources common to a current set of users.

13. The apparatus of claim 12, wherein said search engine is operable to compute a set of all users related to a current set of resources.

14. The apparatus of claim 13, wherein said search engine is operable to consider for expansion all resources outside said current set of resources that have at least one relationship connection with a current set of users.

15. The apparatus of claim 1, wherein said links comprise usage levels of respective resources by respective users.

16. The apparatus of claim 1, wherein said user nodes comprise entities having attributes, and said links comprise a respective user possessing a respective attribute.

17. The apparatus of claim 1, wherein said discovery unit is operable to use said pattern recognition within an iterative tree searching process.

18. The apparatus of claim 1, wherein said discovery unit is operable to insert said groupings as an intermediate set amongst said nodes.

19. The apparatus of claim 1, wherein said users and said resources are arranged into three sets, an intermediate one of said sets comprising predetermined relationship dependent groupings of at least some of the users in a first of said sets, said discovery unit being operable to use said pattern recognition to add new groups to said intermediate set.

20. The apparatus of claim 1, further comprising a graphical expositor operable to graphically represent said user nodes and said resource nodes within said sets.

21. The apparatus of claim 20, wherein the graphical expositor is user interactive to manually modify the groupings discovered by the discovery unit.

22. The apparatus of claim 20, wherein said graphical expositor is further operable to partition the graph into sub-graphs, each of the sub-graphs itself being a partitioned graph having at least two sets, the sub-graphs being limited to a subset of the users in one of the sets, and further comprising all the resources in the other set that are linked to users of said subset, and wherein said discovery unit is further operable to perform groupings on each of the subgraphs, and then to merge the results into a full graph.

23. The apparatus of claim 20, wherein said graphical expositor is further operable to partition the graph into sub-graphs, each of the sub-graphs itself being a bi-partite graph limited to a subset of the resources in the second set, and further comprising all the users in the first set that are linked thereto, and wherein said discovery unit is further operable to perform groupings on each of the subgraphs, and then to merge the results into a full graph.

24. The apparatus of claim 20, wherein said graphical expositor, is user interactive to allow an operator to review user group associations and user resource relations, and to allow said operator to manipulate user access rights.

25. The apparatus of claim 1, wherein said discovery unit is configured to carry out said searching by one member of the group consisting of a clustering algorithm, an incremental search and a search tree.

26. The apparatus of claim 1, wherein said outputting said group comprises outputting a characteristic of said group.

27. Role discovery method for electronically grouping nodes according to existing relationships with resources, the method comprising:
   discovering existing relationship patterns between an arrangement of user nodes and resources across a partition between said user nodes and resources, wherein the patterns are discovered from predetermined relationships between ones of said resources and corresponding user nodes,
   using said discovered patterns, automatically determining groupings of said arrangement of user nodes, wherein user nodes within said groupings share relationships with at least two common resources,
   wherein the user nodes of each of the groupings did not exist as a group prior to discovering the existing relationship patterns, and
   outputting said automatically determined groupings of user nodes having common patterns of at least two existing relationships with resource nodes as a role.

28. A device for discovering existing structure in a partitioned arrangement of user nodes and resources wherein nodes have relationships with various of said resources, the device comprising:
   a processor,
   a discovery unit configured to work with said processor, for discovering relationship patterns within existing relationships between a partitioned arrangement of said user nodes and said resources, wherein:
      the arrangement comprises at least two sets, and
      the existing relationships comprise predetermined relationships defined between said user nodes and said resources across said sets, and
      the discovery unit uses pattern recognition on said user nodes, said resources and said predetermined relationships,
   a node-grouping unit associated with said pattern recognition unit and configured to operate with said processor to use said discovered relationship patterns to automatically determine groups from said user nodes, such that:
      those user nodes that share similar subsets of at least two relationships with said resources are placed in a group together, and
      the user nodes of each group of said groups did not exist as a group prior to discovering the relationship patterns, and
   an output unit configured to output respective groups of said automatically determined groups of user nodes having said similar subsets of at least two relationships as roles.

29. A computer device comprising:
   a processor,
   a first series of user definitions, each user in said definitions defined as a user node;
   a second series of resource definitions, each resource in said definitions defined as a resource node;
   access data indicating access of users to respective resource nodes;
   a pattern recognition unit operable with said processor for recognizing pre-existing patterns in said access data, said patterns indicative of a way of automatically grouping said user nodes of said each user so as to discover groups of user nodes having common subsets of access data related to at least two resources,
   wherein the user nodes of the automatically discovered groups did not exist as a group prior to recognizing the pre-existing patterns in the access data, and
   a group definition unit operable with said processor and said pattern recognition unit configured to output said automatically discovered groups so discovered as roles.

30. Pattern recognition apparatus for grouping nodes according to relationships with other nodes, the apparatus comprising:
   a pattern recognition processor for using pattern recognition on links between nodes partitioned into a first set and a second set, the first set comprising user nodes and the second set comprising resource nodes, to find relationship patterns within said links, and from said relationship patterns to automatically determine at least one group from user nodes of said first set, wherein said nodes being formed into said group share relationships with at least two resource nodes in said second set,
   wherein the user nodes of the automatically determined at least one group did not exist as a group prior to using pattern recognition on the links, and
   wherein the links define relationships across said partition between user nodes in the first set and resource nodes in the second set, and
   an output unit for configured for outputting the automatically determined at least one group.

31. A group discovery method, comprising:
   electronically searching for links between nodes partitioned into a first data set and a second data set, the first data set comprising user nodes and the second data set comprising resource nodes, wherein: said links exist between user nodes in the first data set and resource nodes in the second data set,
   automatically determining a grouping of user nodes in said first set according to respective links found by the electronic searching such that all user nodes in said first set having links to at least two commonly held resource nodes in said second set are assigned to a same group, thereby discovering groups in said data,
   wherein the user nodes of the automatically determined grouping did not exist as a group prior to electronically searching for the links, and
   outputting said automatically determined grouping.

32. A method of grouping users having links or attributes into one or more groups based on said links or attributes, the method comprising:
   searching for the links or attributes of the users, wherein the links or attributes of each user characterize an association between the user and a resource;
   automatically determining a group for users sharing all or a subset of at least two of said links or attributes discovered by the searching step,
   wherein the users of the automatically determined group did not exist as a group prior to searching for the links, and
   outputting said automatically determined group.

33. A search method comprising:
   electronically searching data comprising nodes partitioned into first and second data sets, the first data set comprising user nodes and the second data set comprising resource nodes, wherein links exist within said data between nodes in said first data set and nodes in said second data set, such links being discovered as a result of the electronic searching, automatically determining groupings of nodes in said first set according to respective links discovered as a result of the electronic searching such that all nodes in said first set having links to at least two commonly held nodes in said second set are assigned to a same group, wherein the nodes of each group in the automatically determined groupings of nodes did not exist as a group prior to electronically searching the data, and outputting a group of user nodes in response to automatically determining groupings of nodes in said first set.

34. A search apparatus for searching existing electronically held data, said electronically held data comprising nodes partitioned into first and second data sets, wherein links exist within said data between nodes in said first data set and nodes in said second data set the apparatus comprising:

a search unit, configured for electronically searching for links within data comprising nodes partitioned into first and second data sets, the first data set comprising user nodes and the second data set comprising resource nodes, wherein said links exist within said data between nodes in said first data set and nodes in said second data set, a structuring unit, associated with said search unit, configured for automatically determining groupings of nodes in said first set according to respective links discovered by the search unit such that all nodes in said first set having links to at least two commonly held nodes in said second set are assigned to a same group, thereby automatically discovering groups in said data, wherein the nodes of each group in the automatically determined groupings of nodes did not exist as a group prior to electronically searching for the links within the data and an output unit configured for outputting a group of user nodes in response to the structuring unit automatically determining groupings of nodes in said first set.

* * * * *

UNITED STATES PATENT AND TRADEMARK OFFICE
CERTIFICATE OF CORRECTION

| | | |
|---|---|---|
| PATENT NO. | : 7,904,556 B2 | Page 1 of 1 |
| APPLICATION NO. | : 10/087990 | |
| DATED | : March 8, 2011 | |
| INVENTOR(S) | : Rymon | |

It is certified that error appears in the above-identified patent and that said Letters Patent is hereby corrected as shown below:

Col. 9, Ln. 43: After "group of users" delete "or resources".

Signed and Sealed this
Fourteenth Day of June, 2011

David J. Kappos
*Director of the United States Patent and Trademark Office*